United States Patent
Areh et al.

(10) Patent No.: US 7,228,794 B2
(45) Date of Patent: Jun. 12, 2007

(54) KITCHEN APPLIANCE

(75) Inventors: Marko Areh, Radlje Ob Dravi (SI);
Peter Brezovnik, Mozirje (SI); Henrik Pavlovic, Ljubno Ob Savinji (SI);
Michael Steffl, Marquartstein (DE);
Igor Zibret, Smartno Ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 134 days.

(21) Appl. No.: 10/791,545

(22) Filed: Mar. 1, 2004

(65) Prior Publication Data

US 2005/0028681 A1 Feb. 10, 2005

Related U.S. Application Data

(63) Continuation of application No. PCT/EP02/09460, filed on Aug. 23, 2002.

(30) Foreign Application Priority Data

Aug. 29, 2001 (DE) ................................ 101 42 243

(51) Int. Cl.
*A47J 37/00* (2006.01)

(52) U.S. Cl. .............................. 99/485; 99/501; 99/486

(58) Field of Classification Search .................. 99/501, 99/502, 503, 504, 485, 327, 348, 328, 325, 99/329 R, 326, 329 P, 331, 332, 333, 334, 99/335, 337, 486
See application file for complete search history.

(56) References Cited

U.S. PATENT DOCUMENTS

| | | | | |
|---|---|---|---|---|
| 1,399,080 | A * | 12/1921 | Ross | 366/197 |
| 1,412,996 | A * | 4/1922 | Blessing | 99/501 |
| 1,524,091 | A * | 1/1925 | Flegel | 99/501 |
| 1,823,314 | A * | 9/1931 | Brewer | 366/205 |
| 4,857,240 | A * | 8/1989 | Kearnes et al. | 261/26 |
| 5,035,174 | A | 7/1991 | Seal, Jr. | |
| 5,157,979 | A * | 10/1992 | Brane et al. | 74/58 |
| 6,869,390 | B2 * | 3/2005 | Elliott et al. | 600/1 |

FOREIGN PATENT DOCUMENTS

| | | |
|---|---|---|
| EP | 0 362 058 B1 | 4/1990 |
| EP | 0 875 191 A1 | 11/1998 |
| GB | 2 082 713 A | 3/1982 |

* cited by examiner

*Primary Examiner*—Reginald L. Alexander
(74) *Attorney, Agent, or Firm*—Russell W. Warnock; Craig J. Loest

(57) ABSTRACT

A housing in a kitchen device, in particular, a household fruit press, includes an electric motor and a circuit board, both of which can be simply mounted. The motor and board are to be simply assembled in the housing by configuring the mounting as a hollow cylinder with elastically spring-like wall segments.

20 Claims, 3 Drawing Sheets

KITCHEN APPLIANCE

CROSS-REFERENCE TO RELATED APPLICATION

This application is a continuation, under 35 U.S.C. § 120, of copending international application No. PCT/EP02/09460, filed Aug. 23, 2002, which designated the United States; this application also claims the priority, under 35 U.S.C. § 119, of German patent application No. 101 42 243.1, filed Aug. 29, 2001; the prior applications are herewith incorporated by reference in their entirety.

BACKGROUND OF THE INVENTION

Field of the Invention

The invention relates to an electrical kitchen appliance, specifically a fruit press with a mounting for an electrical motor.

Such a kitchen appliance is already known from European Patent EP 0 362 058 B1. A fruit press with an electrical motor is described therein. The motor is located within the housing. A drive belt and a belt pulley power a drive shaft on which the fruit press is mounted.

SUMMARY OF THE INVENTION

It is accordingly an object of the invention to provide a kitchen appliance that overcomes the hereinafore-mentioned disadvantages of the heretofore-known devices of this general type and that improves upon an electrical kitchen appliance to have a simpler and more compact structure.

With the foregoing and other objects in view, in an electrical kitchen appliance having an electrical motor, there is provided, in accordance with the invention, a motor connection including a motor mount configured as a hollow cylinder with an open front wall, the motor mount mounting the electrical motor therein through the open front wall.

The kitchen appliance according to the invention has a mounting substantially configured as a hollow cylinder and the electrical motor is inserted into the mounting through an open front wall of the mounting.

The motor may be quickly connected with the remaining parts of the kitchen appliance, specifically with the housing parts, by this measure.

In accordance with another feature of the invention, an exterior wall of the mounting that is divided into wall segments running in longitudinal direction is especially suited for the quick connection. The wall segments have supports on their interior side to connect with counter-supports of the electrical motor.

In accordance with a further feature of the invention, the electrical motor has counter-retaining devices, the motor mount has a longitudinal extent and an exterior wall divided into wall segments in a direction of the longitudinal extent, and the wall segments have retaining devices connecting with the counter-retaining devices of the electrical motor.

In accordance with an added feature of the invention, the wall segments have detents on their interior side, which work together with the openings in an exterior panel of the electrical motor. The detents on the wall segments latch into the openings in the exterior panel of the electrical motor by inserting the electrical motor from the open front side of the mounting into the mounting.

In accordance with an additional feature of the invention, additional care has been taken to stabilize the angular position of the longitudinal axis of the electrical motor.

Devices for a clear stabilization of the position of the electrical motor in the direction of rotation of the electrical motor attached to the mounting and to the electrical motor serve this purpose. For example, an indentation or a fitted snap or a longitudinally disposed projection on the interior of the exterior wall or on one of the wall segments of the mounting that corresponds with an appropriate groove in the exterior wall of the electrical motor is suitable.

In accordance with yet another feature of the invention, a mounting of the electrical motor also serves as the attachment of a circuit board in the kitchen appliance in an especially suitable further development. The mounting plate has attaching devices for a connection with counter-devices in the circuit board.

A compact and simple attachment and assembly is produced for the motor as well as for the circuit board by the configuration. The assembly simultaneously serves as safeguard against overloads.

In accordance with yet a further feature of the invention, the retaining devices for the circuit board are, preferably, also disposed on wall segments of the mounting.

In accordance with yet an added feature of the invention, the mount has wall segments and the retaining devices are located on the wall segments.

A kitchen appliance in which the circuit board is placed onto the mounting from the open front wall has been proven to be suitable.

A kitchen appliance in which at least two of the wall segments of the mounting have projections over the front end of the mounting that may be pushed through openings in the circuit board are viewed as suitable and advantageous configurations.

In accordance with yet an additional feature of the invention, the open front wall is configured to receive the circuit board thereon in a push-fit to connect the circuit board to the mount at the open front wall.

Also advantageous are projections with slits into which the detents projecting into the openings of the circuit board are pushed therein.

In accordance with again another feature of the invention, a flexible material, especially plastic, is especially suitable as material for the mounting.

In accordance with again a further feature of the invention, it is furthermore of a special advantage if the circuit board has an opening through which the electrical motor is accessible through which especially the electrical connections of the electrical motor are passed through.

With the objects of the invention in view, in a fruit press having an electrical motor, there is also provided a motor connection including a motor mount configured as a hollow cylinder with an open front wall, the motor mount mounting the electrical motor therein through the open front wall.

With the objects of the invention in view, there is also provided an electrical kitchen appliance, including a housing, an electrical motor disposed in the housing, and a motor mount configured as a hollow cylinder with an open front wall, the motor mount mounting the electrical motor therein through the open front wall.

With the objects of the invention in view, there is also provided an electrical fruit press, including a housing, an electrical motor disposed in the housing, and a motor mount configured as a hollow cylinder with an open front wall, the motor mount mounting the electrical motor therein through the open front wall.

Other features that are considered as characteristic for the invention are set forth in the appended claims.

Although the invention is illustrated and described herein as embodied in a kitchen appliance, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
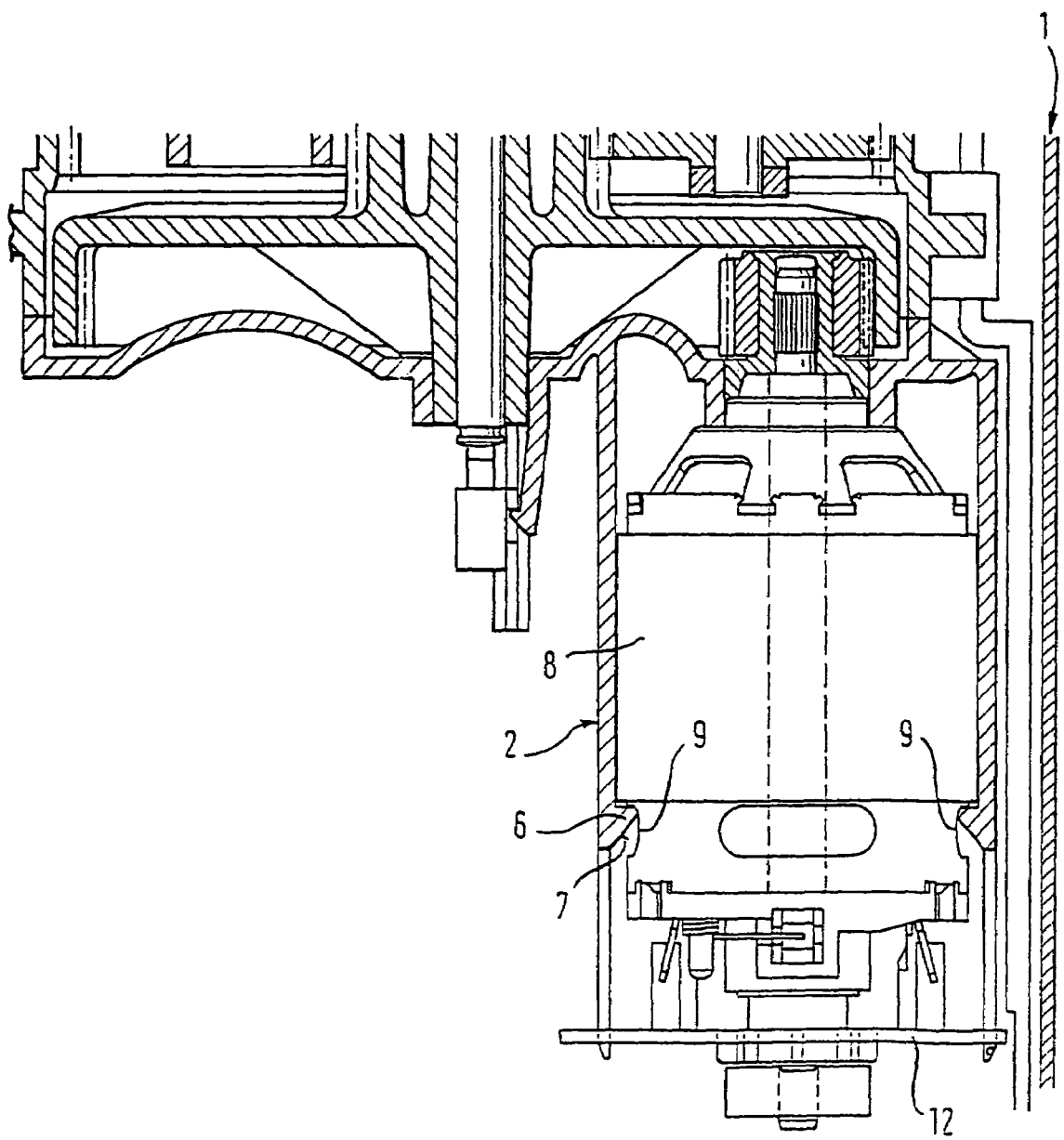
FIG. 1 is a fragmentary, longitudinal cross-sectional view of a kitchen appliance according to the invention with a mounting for an electrical motor and a plan view of the motor.
Figure 2:
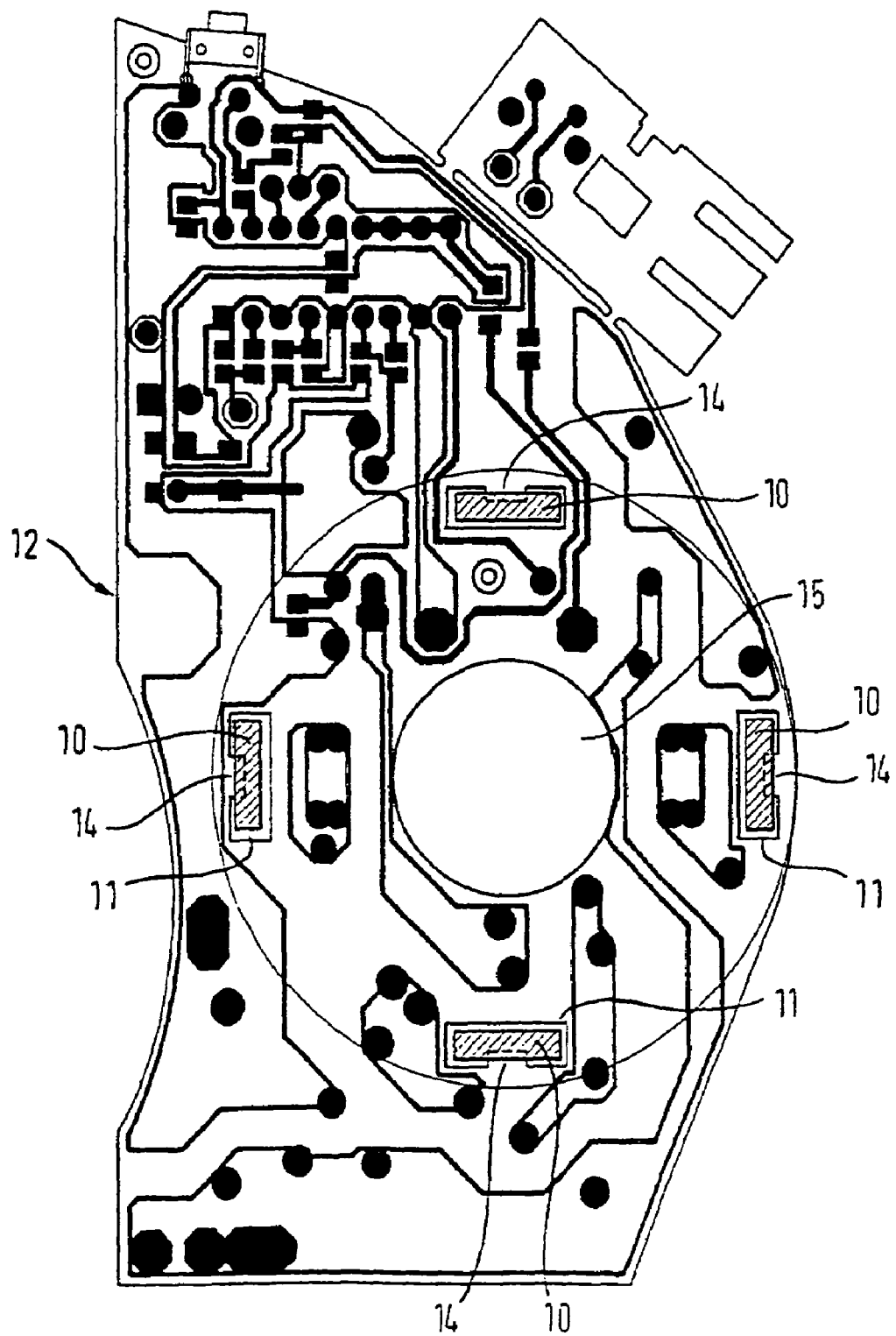
FIG. 2 is a plan view of a circuit board according to the invention.
Figure 3:
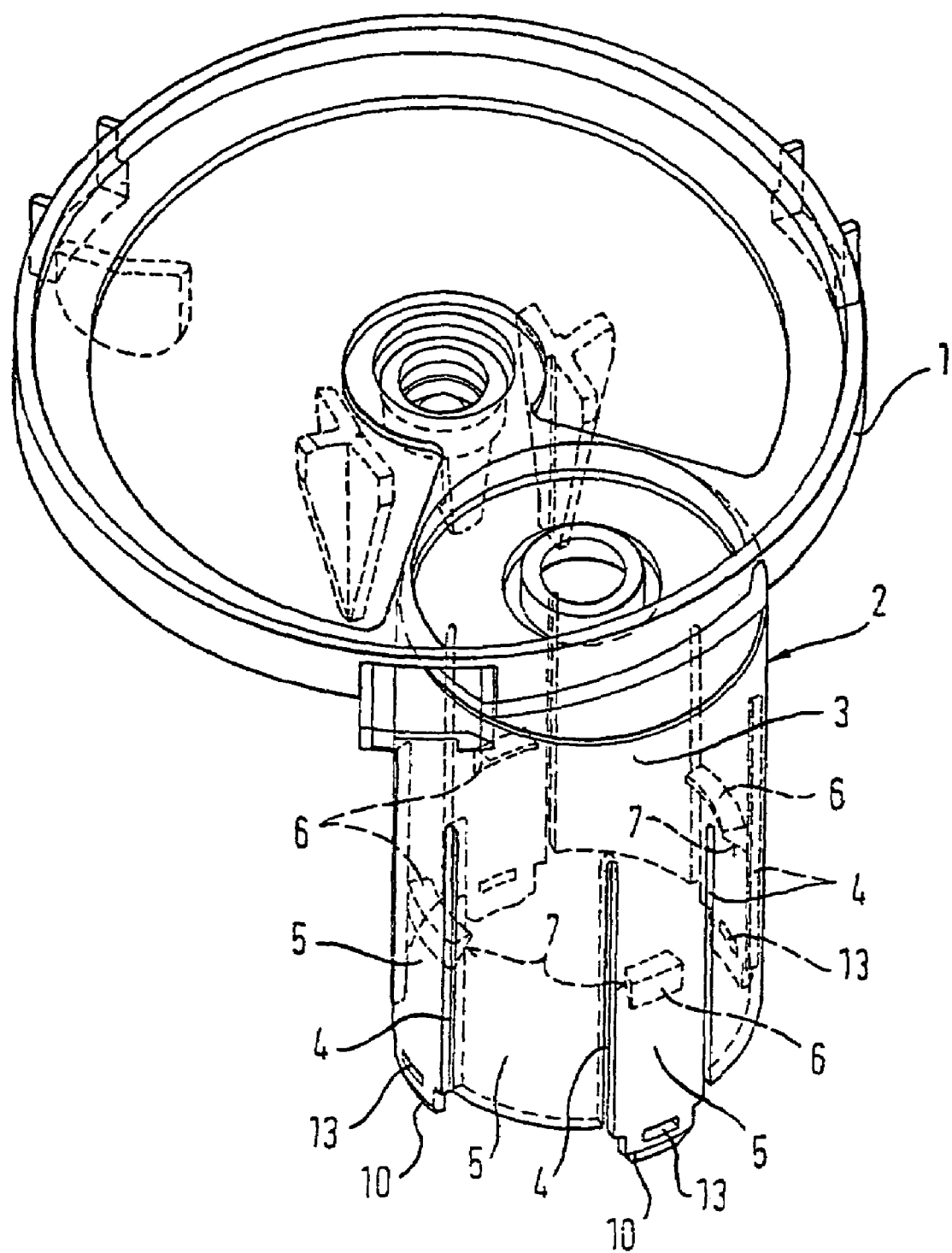
FIG. 3 is a perspective and partially hidden view of the kitchen appliance of FIG. 1.

Referring now to the figures of the drawings in detail and first, particularly to FIG. 1 thereof, there is shown a kitchen appliance having a housing 1 in which a mounting 2 is located. The mounting 2 is of either metal or plastic. The mounting 2 has the form of a hollow cylinder open toward the lower front wall. The mounting 2 is provided with slits 4 on its exterior wall 3 from the front wall that divide the exterior wall 3 into wall segments 5. The wall segments 5 are sufficiently flexible based on the flexibility of the material of which the mounting 2 is constructed to be easily pushed apart. The wall segments 5 alternately have projections or detents 6 that project toward the interior. These projections 6 have a surface 7 in direction of insertion slanted toward the interior over which an electrical motor 8 may be pushed on so that the detents 6 in the openings 9 grip into an exterior wall of the electrical motor 8. The electrical motor 8 is, thereby, secured over its circumference by four detents 6 and is, therefore, securely locked in position.

Some of the wall segments 5 have projections 10 near the open front wall of the mounting 2. For example, the wall segments 5 on which the detents 6 are also located are equipped with projections 10. Alternatively, specifically those wall segments 5 that are equipped with the projections 10 do not have any detents 6.

The detents 10 are sufficiently wide so that they may be inserted through openings 11 in a circuit board 12. To ensure that these are tightly connected with the mounting and that the mounting will remain in this position, the projections 10 have slits 13 into which the fastening projections 14 that project into openings 11 are inserted when circuit board 12 is pushed or snapped upward from below onto the mounting 2.

The circuit board 12 is provided with an at least substantially circular opening 15 through which the electrical motor 8 is accessible. The electrical connections of the electrical motor 8 are specifically connected through the opening 15.

The invention places the mounting 2 in a kitchen appliance, specifically, in a fruit press, in which an electrical motor 8 and a circuit board 12 are mounted by a simple method. They are easily inserted into the mounting 2, which is configured as a hollow cylinder with flexible wall segments 5.

We claim:

1. An electrical kitchen appliance having an electrical motor, a motor connection comprising:
    a motor mount configured as a hollow cylinder with an open front wall, said motor mount mounting said electrical motor therein through said open front wall;
    the kitchen appliance has a circuit board with counter-retaining devices;
    said mount has board retaining devices connecting with the counter-retaining devices of the circuit board; and
    wherein the circuit board has an opening allowing access to the electrical motor in a direction from said open front wall to the motor.

2. The kitchen appliance according to claim 1, wherein:
    the electrical motor has counter-retaining devices;
    said motor mount has a longitudinal extent and an exterior wall divided into wall segments in a direction of said longitudinal extent; and
    said wall segments have retaining devices connecting with the counter-retaining devices of the electrical motor.

3. The kitchen appliance according to claim 1, wherein:
    the counter-retaining devices are openings on an exterior wall of the electrical motor;
    said wall segments have an interior and detents on said interior; and
    said detents act in combination with the openings.

4. The kitchen appliance according to claim 1, wherein said mount and the electrical motor have matching devices for clearly defining a position of the electrical motor in a rotational direction of the electrical motor in said mount.

5. The kitchen appliance according to claim 1, wherein:
    said mount has wall segments; and
    said retaining devices are located on said wall segments.

6. The kitchen appliance according to claim 5, wherein:
    said open front wall has a front end;
    the circuit board has openings; and
    at least two of said wall segments have board projections protruding over said front end of said open front wall, said board projections configured to be pushed through the openings of the circuit board.

7. The kitchen appliance according to claim 5, wherein:
    said open front wall has a front end;
    the counter-retaining devices of the circuit board have openings; and
    said board retaining devices of said mount are board projections on at least two of said wall segments, said board projections protruding over said front end of said open front wall and pushed through the openings of the circuit board to connect the circuit board to the mount.

8. The kitchen appliance according to claim 1, wherein said motor mount has an exterior wall of a flexible material.

9. The kitchen appliance according to claim 8, wherein said material is plastic.

10. The kitchen appliance according to claim 1, wherein the electrical motor has electrical connections inserted through the opening of the circuit board.

11. The kitchen appliance according to claim 6, wherein:
    the circuit board defines openings with fastening projections in said openings; and
    said board projections have slits into which the fastening projections protrude.

12. The kitchen appliance according to claim 7, wherein:
the circuit board defines openings with fastening projections in the openings; and
said board projections have slits into which the fastening projections protrude.

13. A kitchen appliance, comprising:
a housing;
an electrical motor including an edge at least partially formed by an exterior wall of the motor;
a cylindrical motor mount disposed within the housing and including:
an open end for receiving the motor;
at least one flexible wall segment extending axially along the mounting; and
a detent disposed on the flexible wall segment and projecting radially inwardly, the detent engaging the edge to retain the motor within the motor mount;
a circuit board including at least one board opening; and
at least one wall projection extending in an axial direction from at least one of the wall segments near the open end and engaging the circuit board opening to connect the circuit board to the open end of the motor mount.

14. The kitchen appliance according to claim 13, wherein the motor includes a motor opening at least partially formed by an exterior wall of the motor, the edge at least partially defining the motor opening and the detent engaging the opening.

15. The kitchen appliance according to claim 13, further comprising:
a projection slit formed in the at least one wall projection; and
a fastening projection projecting from the circuit board into the board opening and engaging the projection slit to connect the circuit board to the motor mount.

16. The kitchen appliance according to claim 13, wherein the circuit board defines an access opening and electrical connections of the motor extend through the access opening.

17. The kitchen appliance according to claim 13, wherein the kitchen appliance includes a fruit press.

18. A kitchen appliance, comprising:
a housing;
an electrical motor including multiple motor openings at least partially formed by an exterior wall of the motor;
a cylindrical motor mount disposed within the housing and including:
an open end for receiving the motor;
multiple flexible wall segments extending axially along the mounting and spaced apart by wall slits; and
multiple detents disposed on the flexible wall segments and projecting radially inwardly, each detent engaging one of the motor openings to retain the motor within the motor mount;
a circuit board including multiple board openings; and
multiple wall projections with each wall projection extending in an axial direction from one of the wall segments near the open end, each wall projection engaging one of the circuit board openings to connect the circuit board to the open end of the motor mount.

19. The kitchen appliance according to claim 18, further comprising:
multiple projection slits with each projection slit being formed in one of the wall projections; and
multiple fastening projections with each fastening projection projecting from the circuit board into one of the board openings, each fastening projection engaging one of the projection slits to connect the circuit board to the motor mount.

20. The kitchen appliance according to claim 18, wherein the circuit board defines an access opening and electrical connections of the motor extend through the access opening.

* * * * *